United States Patent
Roberts et al.

(10) Patent No.: US 11,734,932 B2
(45) Date of Patent: Aug. 22, 2023

(54) STATE AND EVENT MONITORING

(71) Applicant: Alarm.com Incorporated, Tysons, VA (US)

(72) Inventors: Aaron Lee Roberts, Centreville, VA (US); Bret Jutras, Sterling, VA (US)

(73) Assignee: Alarm.com Incorporated, Tysons, VA (US)

( * ) Notice: Subject to any disclaimer, the term of this patent is extended or adjusted under 35 U.S.C. 154(b) by 343 days.

(21) Appl. No.: 17/085,726

(22) Filed: Oct. 30, 2020

(65) Prior Publication Data

US 2021/0133462 A1 May 6, 2021

Related U.S. Application Data

(60) Provisional application No. 62/928,558, filed on Oct. 31, 2019.

(51) Int. Cl.
*G06V 20/52* (2022.01)
*G06F 18/22* (2023.01)
*G06F 18/214* (2023.01)
*G06F 18/21* (2023.01)
*G06V 10/80* (2022.01)

(52) U.S. Cl.
CPC ........... *G06V 20/52* (2022.01); *G06F 18/214* (2023.01); *G06F 18/2193* (2023.01); *G06F 18/22* (2023.01); *G06V 10/809* (2022.01)

(58) Field of Classification Search
None
See application file for complete search history.

(56) References Cited

U.S. PATENT DOCUMENTS

| | | | |
|---|---|---|---|
| 10,565,837 B1* | 2/2020 | Hesford | G08B 25/005 |
| 10,755,543 B1* | 8/2020 | Usie | G08B 13/19634 |
| 10,803,667 B1* | 10/2020 | Madden | G06T 19/006 |
| 11,200,786 B1* | 12/2021 | Madden | G08B 13/1672 |
| 2016/0019426 A1* | 1/2016 | Tusch | G06V 20/47 386/286 |
| 2018/0276197 A1* | 9/2018 | Nell | G10L 15/22 |
| 2019/0122031 A1* | 4/2019 | Eriksson | G06V 40/50 |
| 2019/0221104 A1* | 7/2019 | Hesford | G08B 25/014 |
| 2020/0341436 A1* | 10/2020 | Saxena | G05B 13/0265 |
| 2020/0359175 A1* | 11/2020 | Schobel | G08B 21/0283 |
| 2021/0027485 A1* | 1/2021 | Zhang | G06T 7/73 |
| 2021/0117658 A1* | 4/2021 | Taheri | G06V 40/20 |
| 2022/0375318 A1* | 11/2022 | Trundle | H04W 4/80 |

* cited by examiner

Primary Examiner — Delomia L Gilliard
(74) Attorney, Agent, or Firm — Fish & Richardson P.C.

(57) ABSTRACT

Methods, systems, and apparatus, including computer programs encoded on computer-storage media, for state and event monitoring. In some implementations, images captured by a camera are obtained, the images depicting an area of a property. Two or more images of the images are provided to a machine learning model. An output of the machine learning model is obtained, the output corresponding to the two or more images. One or more potential states of the area of the property are determined using the output of the machine learning model, each state of the one or more potential states corresponding to an image in the two or more images. An action is performed based on the one or more potential states.

20 Claims, 5 Drawing Sheets

STATE AND EVENT MONITORING

CROSS-REFERENCE TO RELATED APPLICATIONS

This application claims the benefit of U.S. Provisional Application No. 62/928,558, filed Oct. 31, 2019, and titled "STATE AND EVENT MONITORING," which is incorporated by reference in its entirety.

TECHNICAL FIELD

The present specification relates to security systems.

BACKGROUND

Various security sensors and equipment can be used for home monitoring.

SUMMARY

In some implementations, a security system of a property leverages one or more machine learning models to determine a state or event of the property or for a specific area of the property. In determining a state, the security system can collect a subset of images from one or more cameras and analyze each of the images to determine a state for each of images. If there is inadequate agreement between the states corresponding to each of the images, the security system may perform one or more actions. These actions may include accessing sensor or equipment data and using that data to confirm the current state, requesting input from a user and using that input to confirm the current state, and/or obtaining a new subset of images.

In some implementations, the security system obtains a video clip and the subset of images are frames within the video clip. The subset of images may include each of the frames within the video clip. The subset of images may include multiple frames that are sampled from the video clip.

In some implementations, the security system may request that a user indicate or confirm a state of a property or a specific area of the property based on one or more images. The input provided by a user may be used to update one or more machine learning models that are used to determine a state of the property or a specific area of the property. In indicating a state, a user may select a state from a list of previously entered or otherwise predefined states. In indicating a state, a user may define a new or custom state. In confirming a state, a user may select a state from a list of identified states.

In some implementations, when the security system determines that a state for the property or a specific area of the property has changed from a previous state, the security system determines that an event has occurred. The previous state may be an immediately preceding state. When an event occurs, the security system may generate and send a notification to a user. The notification can include one or more text messages, emails, or app notifications.

In one general aspect, a method includes obtaining images captured by a camera, the images depicting an area of a property; providing two or more images of the images to a machine learning model; obtaining an output of the machine learning model corresponding to the two or more images; determining one or more potential states of the area of the property using the output of the machine learning model, each of the one or more potential states corresponding to an image in the two or more images; and performing an action based on the one or more potential states.

Implementations may include one or more of the following features. For example, in some implementations, determining one or more potential states of the area of the property includes determining two or more states corresponding to the two or more images, includes determining that the two or more states are not sufficiently similar, where performing the action includes performing an action based on the two or more states not being sufficiently similar.

In some implementations, determining that the two or more states are not sufficiently similar includes: for each of the two or more images, determining, from the output of the machine learning model, a confidence for one or more potential states corresponding to the respective image; for each of the two or more images, (i) selecting a state for the respective image from the one or more potential states based on the confidences corresponding to one or more potential states or (ii) determining that no state can be identified with sufficient confidence for the respective image based on the confidences corresponding to one or more potential states, where the two or more states are the selected states; calculating a similarity score for the two or more images based on the two or more states; and determining that the similarity score corresponding to the two or more images fails to meet a threshold similarity score, and performing an action based on the two or more states not being sufficiently similar includes performing an action based on the similarity score failing to meet the threshold similarity score.

In some implementations, selecting the state for the respective image from the one or more potential states includes selecting, for the respective image, a state from the one or more potential states associated with the highest confidence.

In some implementations, selecting the state for the respective image from the one or more potential states includes identifying, for the respective image, a state from the one or more potential states associated with a confidence that meets a threshold confidence.

In some implementations, determining that no state can be identified with sufficient confidence for the respective image includes determining, for the respective image, that none of the confidences associated with the one or more potential states meet a threshold confidence.

In some implementations, calculating the similarity score for the two or more images includes calculating a similarity score that indicates extent of state matches between the two or more states corresponding to the two or more images.

In some implementations, calculating the similarity score for the two or more images includes: determining a highest number of state matches for a particular state in the two or more states; and calculating a similarity score using the highest number of state matches, where the similarity score is indicative of a comparison between the highest number of state matches and a total number of states in the two or more states.

In some implementations, performing the action based on the two or more states not being sufficiently similar includes obtaining external data, and the method includes determining a current state of the area of the property using the external data.

In some implementations, obtaining external data includes: in response to the two or more states not being sufficiently similar, generating a request that queries a user to select the current state from among a list of potential states of the area of the property, or that queries the user to input the current state; transmitting the request to a user device of the user; and receiving a response to the request from the user device, the response indicating the current state of the area property, and determining the current state of the area of the property using the external data includes determining the current state of the area of the property using the response.

In some implementations, generating the request that queries the user to select the current state from among the list of potential states of the area of the property includes generating a request that queries the user to select from each unique state in the two or more states, or each unique state in the two or more states that is associated with a confidence that meets a threshold confidence, receiving the response to the request from the user device includes receiving a response that includes a selection of a first unique state in the two or more states, and determining the current state of the area of the property using the response includes determining that the current state of the area of the property is the first unique state of the two or more states.

In some implementations, obtaining external data includes obtaining sensor data from one or more electronic devices, and determining the current state of the area of the property using the external data includes verifying a particular state of the two or more states as the current state of the area of the property using the sensor data.

In some implementations, obtaining external data includes: obtaining one or more new images; providing the one or more new images to the machine learning model; obtaining an new output of the machine learning model corresponding to the one or more new images; and determining a new state of the area of the property using the new output of the machine learning model, and determining the current state of the area of the property using the external data includes verifying a particular state of the two or more states as the current state of the area of the property using the new state.

In some implementations, the method includes: determining a prior state for the area of the property; determining that the prior state does not match the current state; and based on the prior state not matching the current state, notifying a user device of a change in the state of the area of the property.

In some implementations, determining the current state of the area of the property includes determining a device is present in the area of the property, determining that the prior state for the area of the property includes determining that device was previously not present in the area of the property, and notifying the user device of the change in the state of the area of the property includes transmitting a notice to the user device indicating at least one of the following: a change in state of the area of the property has occurred, the device was previously not present in the area of the property, and the device is currently present in the area of the property.

In some implementations, determining the current state of the area of the property includes determining a device is connected to a second device, determining that the prior state for the area of the property includes determining that device was previously not connected to the second device, and notifying the user device of the change in the state of the area of the property includes transmitting a notice to the user device indicating at least one of the following: a change in state of the area of the property has occurred; the device was previously not connected to the second device in the area of the property; and the device is currently connected to the second device in the area of the property.

In some implementations, determining the current state of the area of the property includes determining a device is in a first state, determining that the prior state for the area of the property includes determining that device was previously in a second state different from the first state, and notifying the user device of the change in the state of the area of the property includes transmitting a notice to the user device indicating at least one of the following: a change in state of the area of the property has occurred; the device was previously in the second state; and the device is currently in the first state.

In some implementations, determining a prior state for the area of the property; determining that the prior state does not match the current state; and based on the prior state not matching the current state, generating instructions for one more external electronic devices to change a mode of the of the one or more electronic devices; and transmitting the instructions to the one or more electronic devices.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue of having instructions that, when executed by data processing apparatus, cause the apparatus to perform the actions.

The disclosed techniques can be used to realize numerous advantages. For example, the disclosed techniques can be used to improve the accuracy of state and event monitoring. Notably, in determining a current state of an environment such as a particular area of a property, the disclosed system can obtain and analyze multiple images to determine likely states for the multiple images. These likely states can be compared to determine a current state for the environment. Accuracy can be improved by using the multiple images to determine the current state. For example, using multiple images can be help to avoid overreliance on any one image to determine the current state of the environment. A single image may not accurately depict the current state as it may depict only very temporary conditions, e.g., due to the presence of animate objects in the environment (e.g., animals, pets, persons, etc.) that may temporarily obstruct the view of objects or modes of those objects.

State and event monitoring accuracy can be further improved through the use of supplemental information. As an example, if a sufficient confidence to determine a current state for the environment is not obtainable based on the results of the initial image analysis, the system may obtain additional data to determine or verify the current state of the environment. That is, if there is inadequate agreement between the determined states of the multiple images, the system may request additional data in order to identify the current state or verify the current state with an acceptable level of accuracy. This additional data may include, for example, user responses to a request for information, sensor data from one or more external electronic devices, or additional image data. The request for information sent to the user may include one or more images that the user can use to accurately determine the current state of the environment, or determine if one or more events have occurred. The request may include a request for the user to select a current state from a list of current states, an event from a list of events, a request for a user to enter a current state, or a request for a user to enter one or more events that have occurred.

Various other benefits can be achieved as a result of the improved state and event monitoring accuracy. For example, the number of false positives and false negatives for various states and events can be reduced. This can save time for users and lessen the frustration they might otherwise experience. This can also improve safety of occupants and others. For example, a false positive as to the state of the oven, such as one that incorrectly suggests that the oven is currently off, may lead to disastrous consequences.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A security system of a property may be integrated with numerous security sensors and equipment. These sensors and equipment can be used to monitor all or a portion of a property, and can include one or more cameras. The security system can leverage one or more machine learning models to determine a current state of the property or a portion of the property. The security system can provide video data or a subset of images to the one or more machine learning models. The one or more machine learning models can output one or more states. If there is adequate agreement between the outputted states, the security system may determine a current state. The security system can detect particular events by comparing the current state to a prior state, such as an immediately preceding state. In response to detecting an event, the security system may generate and send a notification to one or more users, such as the occupants of the property.

The one or more machine learning models can be updated using input from one or more users. The input may be requested by the security system. The input may be entered by a user when configuring the security system. The input may be entered by a user as feedback, e.g., in response to a state determination or event detection.

Figure 1:
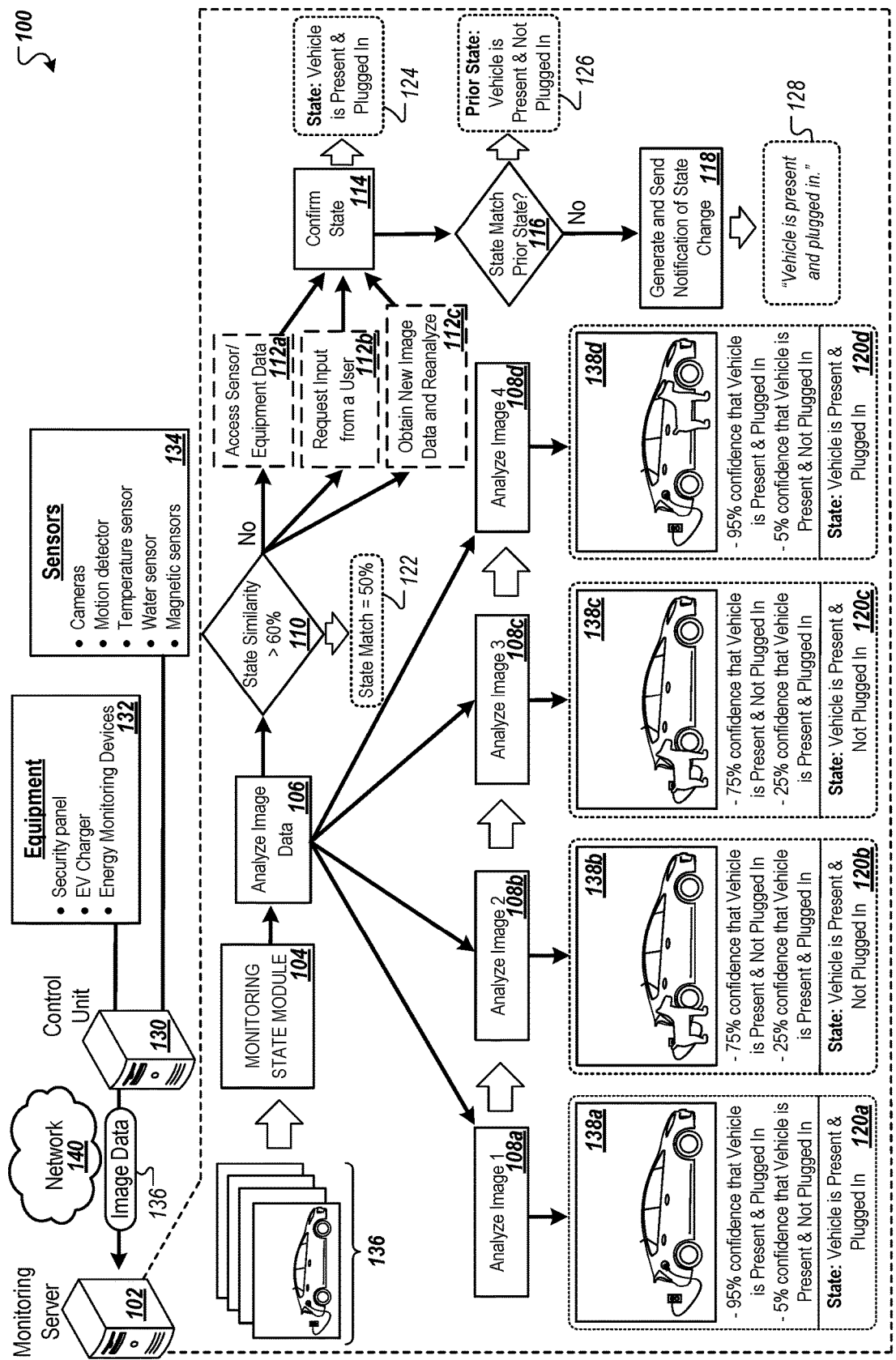
FIG. 1 is a diagram showing an example of a system for state and event monitoring.

FIG. 1 is a diagram showing an example of a system 100 for state and event monitoring. The system 100 includes a monitoring server 102, a control unit 130, security equipment 132, and security sensors 134. The equipment 132 and sensors 134 may be installed at a particular property (e.g., the property 230 shown in FIG. 2). Various components of the system 100 may communicate over a network 140.

The control unit 130 may include one or more computing devices. The control unit 130 may communicate with equipment 132 and sensors 134 through a wired and/or wireless connection. The control unit 130 may receive equipment and sensor output information from the equipment 132 and the sensors 134, respectively. The control unit 130 can communicate with the monitoring server 102 over the network 140. The control unit 130 may communicate with computing devices of users, such as occupants of the property in which the equipment 132 and the sensors 134 are installed.

The sensors 134 may include, for example, one or more visible-light cameras, infrared-light cameras (IR cameras), magnetic sensors (e.g., that are installed on one or more doors and/or windows), motion detectors, temperature sensors, and/or water sensors.

The equipment 132 may include, for example, one or more security panels, electronic vehicle chargers, energy monitoring devices, smart plugs, thermostats, smart HVAC system, smoke detectors, CO detectors, energy meters, smart locks, or garage door controllers. One or more pieces of equipment of the equipment 132 may integrate or utilize one or more sensors of the sensors 134.

The monitoring server 102 may include one or more computing devices. The monitoring server 102 may also include one or more data storage devices. The monitoring server 102 may communicate with the control unit 130 and/or user devices over the network 140.

The network 140 can include public and/or private networks and can include the Internet.

The disclosed techniques can be used to realize numerous advantages. For example, the disclosed techniques can be used to improve the accuracy of state and event monitoring. Notably, in determining a current state of an environment such as a particular area of a property, the monitoring server 102 can obtain and analyze multiple images to determine likely states for the multiple images. These likely states can be compared to determine a current state for the environment. Accuracy can be improved by using the multiple images to determine the current state. For example, using multiple images can be help to avoid overreliance on any one image to determine the current state of the environment. A single image may not accurately depict the current state as it may depict only very temporary conditions, e.g., due to the presence of animate objects in the environment (e.g., animals, pets, persons, etc.) that may temporarily obstruct the view of objects or modes of those objects.

State and event monitoring accuracy can be further improved through the use of supplemental information. As an example, if a sufficient confidence to determine a current state for the environment is not obtainable based on the results of the initial image analysis, the monitoring server 102 may obtain additional data to determine or verify the current state of the environment. That is, if there is inadequate agreement between the determined states of the multiple images, the monitoring server 102 may request additional data in order to identify the current state or verify the current state with an acceptable level of accuracy. This additional data may include, for example, user responses to a request for information, sensor data from one or more external electronic devices, or additional image data. The request for information sent to the user may include one or more images that the user can use to accurately determine the current state of the environment, or determine if one or more events have occurred. The request may include a request for the user to select a current state from a list of current states, an event from a list of events, a request for a user to enter a current state, or a request for a user to enter one or more events that have occurred.

Various other benefits can be achieved as a result of the improved state and event monitoring accuracy. For example, the number of false positives and false negatives for various states and events can be reduced. This can save time for users and lessen the frustration they might otherwise experience. This can also improve safety of occupants and others. For example, a false positive as to the state of the oven, such as one that incorrectly suggests that the oven is currently off, may lead to disastrous consequences.

As shown in FIG. 1, the control unit 130 sends image data 136 to the monitoring server 102 over the network 140. The image data 136 may have been acquired through one or more cameras of the sensors 134. The image data 136 may be a video clip. The image data 136 may be a set of images. The image data 136 may correspond with a particular area of a monitored property. For example, the image data 136 may be image data acquired by cameras that monitor a specific room or area of the monitored property, e.g., the garage, the kitchen, a bedroom, a living room, a foyer, an office, etc. The image data 136 may correspond with a particular camera of a monitored property. For example, the image data 136 may be image data acquired by a first camera of the sensors 134 that monitors the garage of the monitored property. The image data 136 may correspond with a particular type of monitoring. For example, the image data 136 may include image data corresponding to vehicle monitoring (e.g., includes images or videos taken from cameras monitoring the garage and driveway of a monitored property), to break-in monitoring (e.g., includes images or videos taken from cameras monitoring the doors and windows of a monitored property), appliance monitoring (e.g., includes images or videos taken from one or more cameras monitoring kitchen appliances of a monitored property), etc.

The monitoring server 102 may provide the image data 136 to a monitoring state module 104. As shown, the image data 136 includes an image of a vehicle taken by a camera monitoring a garage of a property. The monitoring state module 104 may perform various operations with the image data 136. The monitoring state module 104 may leverage one or more machine learning models in order to determine one or more states corresponding to the image data 136.

In some implementations, prior to analyzing the image data 136, the monitoring state module 104 samples the image data 136, e.g., in the case where the image data 136 is a video clip, to acquire a set of images to analyze.

The monitoring state module 104 analyzes the image data 136 (106). In analyzing the image data 136, the monitoring state module 104 provides multiple images 138a-d within the image data 136 as input to one or more machine learning models. Here, the image data 136 includes four images 138a-d. The one or more machine learning models may output confidence scores that correspond with potential states. The one or more machine learning models that are provided as input may be selected based on the image data 136. For example, the machine learning models may each correspond to a particular area or portion of a property corresponding to the image data 136, one or more particular cameras that were used to acquire the image data 136, and/or a type of monitoring corresponding to the image data 136. As will be discussed in more detail below with respect to FIG. 2, the potential states may have been preexisting. For examples, the potential states may have been preset or may have created by a user of the system 100. The potential states may correspond to a particular area or portion of a monitored property, one or more particular cameras, and/or with a type of monitoring. The potential states may correspond to one or more machine learning models. For example, the monitoring state module 104 may select a machine learning model that corresponds to vehicle monitoring or monitoring the garage of a property. For this machine learning model (or this area of the monitored property or this type of monitoring), there may be three preexisting states including, for example, (i) vehicle is present and plugged in, (ii) vehicle is present and not plugged in, and (iii) vehicle is not present.

The monitoring state module 104 proceeds to analyze the first image 138a (108a) by providing the first image 138a as input to the one or more machine learning models. The first image 138a shows an EV that has an EV charger plugged in. The one or more machine learning models determine with 95% confidence a first state that the vehicle is present and plugged in, and determines with 5% confidence a second state that the vehicle is present and not plugged in. Accordingly, the one or more machine learning models determine with 100% confidence (or near 100% confidence) that the vehicle is present, however there exists some slight doubt as to whether the vehicle is currently plugged in or not. The monitoring state module 104 may determine a state 120a corresponding to the first image 138a based on the output of the one or more machine learning models. Here, the monitoring state module 104 correctly determines that the state 120a corresponding to the first image 138a is that the vehicle is present and plugged in.

In determining a state corresponding to a particular image, the monitoring state module 104 may apply a threshold to the output of the one or more machine learning modules. For example, the monitoring state module 104 may apply a threshold of 50%, 60%, or 70% to the output of the one or more machine learning models. Because the confidence score of 95% corresponding to the state 120a exceeds the applied threshold, the monitoring state module 104 may select the state 120a as the state corresponding to the first image 138a. The threshold applied to the images within image data 136 may depend on, for example, the area or portion of the monitored property corresponding to the image data 136, the camera(s) that acquired the image data 136, and/or the type of monitoring corresponding to the image data 136. For example, when analyzing image data corresponding to a garage of a property, the monitoring state module 104 may apply a first threshold that is different than another threshold to be applied to image data corresponding to a kitchen of the property.

After the state monitoring module 104 has analyzed or started analyzing the first image 138a, the state monitoring module may proceed to analyze the second image 138b (108b) by providing the second image 138b as input to the one or more machine learning models. The second image 138b shows an EV that has an EV charger plugged in, and also shows a dog partially blocking the view of the EV and of the EV charger. The one or more machine learning models determine with 75% confidence a first state that the vehicle is present and not plugged in (e.g., due to the dog blocking the view of the EV where the EV charger is plugged in), and determines with 25% confidence a second state that the vehicle is present and plugged in. Accordingly, the one or more machine learning models determine with 100% confidence (or near 100% confidence) that the vehicle is present, however there exists some significant doubt as to whether the vehicle is currently plugged in or not. The monitoring state module 104 may determine a state 120b corresponding to the second image 138b based on the output of the one or more machine learning models. Here, the monitoring state module 104 incorrectly determines that the state 120b corresponding to the second image 138b is that the vehicle is present and not plugged in.

After the state monitoring module 104 has analyzed or started analyzing the second image 138b, the state monitoring module may proceed to analyze the third image 138c (108c) by providing the third image 138c as input to the one or more machine learning models. The third image 138c shows an EV that has an EV charger plugged in, and also shows a dog partially blocking the view of the EV and of the EV charger. The one or more machine learning models determine with 75% confidence a first state that the vehicle is present and not plugged in (e.g., due to the dog blocking the view of the EV where the EV charger is plugged in), and determines with 25% confidence a second state that the vehicle is present and plugged in. Accordingly, the one or more machine learning models determine with 100% confidence (or near 100% confidence) that the vehicle is present, however there exists some significant doubt as to whether the vehicle is currently plugged in or not. The monitoring state module 104 may determine a state 120c corresponding to the third image 138c based on the output of the one or more machine learning models. Here, the monitoring state module 104 incorrectly determines that the state 120c corresponding to the third image 138c is that the vehicle is present and not plugged in.

After the state monitoring module 104 has analyzed or started analyzing the third image 138c, the state monitoring module may proceed to analyze the fourth image 138d (108d) by providing the fourth image 138d as input to the one or more machine learning models. The fourth image 138d shows an EV that has an EV charger plugged in, and also shows a dog partially blocking the view of the EV. The one or more machine learning models determine with 95% confidence a first state that the vehicle is present and plugged in (e.g., due to the dog no longer blocking the view of the EV where the EV charger is plugged in), and determines with 5% confidence a second state that the vehicle is present and not plugged in. Accordingly, the one or more machine learning models determine with 100% confidence (or near 100% confidence) that the vehicle is present, however there exists some slight doubt as to whether the vehicle is currently plugged in or not. The monitoring state module 104 may determine a state 120d corresponding to the fourth image 138d based on the output of the one or more machine learning models. Here, the monitoring state module 104 correctly determines that the state 120d corresponding to the fourth image 138d is that the vehicle is present and plugged in.

Although the example provided above involves an analysis of four images, more or less images (but at least two) may be analyzed.

In some implementations, the monitoring state module 104 analyzes the images 138a-d concurrently instead of asynchronously.

After the monitoring state module 104 has finished analyzing the image data 136, the monitoring state module 104 determines if there is sufficient state similarity (110). In determining if there is sufficient state similarity, the monitoring state module 104 first determines a similarity score 122 (e.g., a percentage indicative of similarity or agreement) between the states 120a-d of the analyzed images 108a-d.

In some implementations, the set of images that are used by the monitoring state module 104 in determining the similarity score 122 may include all of the images in the image data 136. The image data 136 may consist of a predetermined number of sequential images. For example, the image data 136 may consist of the four, six, ten, or twenty most recent images taken from the camera of the sensors 134 monitoring the garage of a property. Accordingly, the number of images used by the monitoring state module 104 in determining the similarity score 122 may be predetermined. As an example, the predetermined number may be four such that the image data 136 consists of the four images 108a-d. The images 108a-d can form the set of images that are used by the monitoring state module 104 in determining the similarity score 122.

In some implementations, the set of images that are used by the monitoring state module 104 in determining the similarity score 122 may include a subset of the images in the image data 136. The subset of images may consist of a predetermined number of sequential images. For example, the subset of images may consist of the four, six, ten, or twenty sequential images taken from the image data 136. Accordingly, the number of images used by the monitoring state module 104 in determining the similarity score 122 may be predetermined. As an example, the predetermined number may be four such that the subset of images consists of the four images 108a-d. The images 108a-d can form the set of images that are used by the monitoring state module 104 in determining the similarity score 122.

As shown, the similarity score 122 between the states 120a-d is 50% as the states 120a and 120d match, and the states 120b and 120c match. Next, the monitoring state module 104 compares the similarity score 122 to a similarity threshold. For example, the monitoring state module 104 compares the similarity score 122 of 50% to a similarity threshold of 60%. Because the similarity score 122 does not meet the similarity threshold, the monitoring state module 104 may perform one or more optional actions 112a-c.

In cases where the similarity score 122 meets the similarity threshold, the monitoring state module 104 may confirm the state (114) of the image data 136 without performing any of the actions 112a-c. In these cases, the state of the image data 136 would be the state that is most prevalent among the determined states 120a-d.

In some implementations, the similarity threshold is the same as the confidence threshold applied, in some implementations, during the analysis of images 138a-d.

In some implementations, the similarity threshold is different than the confidence threshold applied, in some implementations, during the analysis of images 138a-d.

After determining that the similarity score 122 does not meet a similarity threshold, the monitoring state module 104 may access additional sensor and/or equipment data from the sensors 134 and/or equipment 132 (112a). For example, in the case where there is a question as to whether the vehicle is plugged in, the monitoring state module 104 may request and receive data from the EV charger or data from one or more energy monitoring devices (e.g., that measure the current energy drain for all or part of the monitored property, or that measure the energy drain at a particular wall socket). This data may indicate whether the vehicle is currently charging. For example, the data may indicate that significant energy is being drawn from the wall socket that the EV charger is plugged into. The monitoring state module 104 may use this data to confirm the state of the image data 136. For example, where the sensor and/or equipment data indicate that the vehicle is charging, the monitoring state module 104 may confirm the state 124 (114) corresponding to the image data 136, that the vehicle is present and plugged in. The state 124 is the same as the previously determined states 120a and 120d.

As another example, the monitoring state module 104 may use data from one or more magnetic sensors to confirm whether a door or window has been opened. Similarly, the monitoring state module 104 may use data from a motion detector to confirm whether a door or window has been opened.

As an example, the monitoring state module 104 may use data from one or more energy monitoring devices to confirm whether an appliance, such as an oven, stove, or refrigerator, is on. Similarly, the monitoring state module 104 may use data from one or more temperature sensors to confirm whether an appliance, such as an oven, stove, or refrigerator, is on.

As another example, the monitoring state module 104 may use data from one or more water sensors to confirm whether any faucets or a particular faucet is running.

In some implementations, in accessing sensor and/or equipment data (112*a*), the monitoring state module 104 requests and receives data from multiple sensors and/or pieces of equipment.

In some implementations, the monitoring state module 104 uses the accessed sensor and/or equipment data to train the one or more of the machine learning models that were used to analyze the images 138*a-d*. For example, where the accessed sensor and/or equipment data is used to confirm the state 124 (that is equivalent to the determined states 120*a* and 120*d*) corresponding to the image data 136, the monitoring state module 104 may train the one or more machine learning models with the images 138*b* and 138*c* to recognize that the images 138*b* and 138*c* depict the state 124, that the vehicle is present and plugged in.

After determining that the similarity score 122 does not meet a similarity threshold, the monitoring state module 104 may request and receive input from a user (112*b*). The request may be sent by the monitoring server 102 to one or more user devices, e.g. through the network 140. The request may be sent to devices of multiple users, e.g. the residents of the monitored property. The request may be sent by email, by text message (e.g., SMS, MMS, etc.), instant message, an app notification, etc. The request may include all or part of the image data 136, e.g. the images 138*a-d*. The request may ask the user(s) to confirm the state corresponding to the image data 136 based on all or the portion of the image data 136 provided to the user(s).

The monitoring state module 104 may use input it receives from the user(s) to confirm the state 124 (114) corresponding to the image data 136. For example, the monitoring state module 104 may receive an indication from the user(s) that the current state is that the vehicle is present and plugged in.

Where input is requested and received from multiple users, the monitoring state module 104 may confirm the state 124 as the state indicated by the input that is first received, may confirm the state 124 as the state most frequently selected, or may confirm the state 124 as the state selected by the most trustworthy user of the users who provided input.

As will be described in more detail with respect to FIG. 2, the user(s) may indicate the correct state by selecting the state from list of preexisting states (e.g., that correspond with the image data 136). The user(s) may alternatively enter a new or custom state to describe the state corresponding to the image data 136. The monitoring state module 104 may add the new or custom state to a list of preexisting states, and may associate the new or custom state with the particular location of the property corresponding to the image data 136, the particular camera(s) used to acquire the image data 136, and/or the type of monitoring corresponding to the image data 136 (e.g., vehicle monitoring).

In some implementations, the monitoring state module 104 uses the input from the user(s) to train the one or more of the machine learning models that were used to analyze the images 138*a-d*. For example, where the input from the user(s) is used to confirm the state 124 (that is equivalent to the determined states 120*a* and 120*d*) corresponding to the image data 136, the monitoring state module 104 may train the one or more machine learning models with the images 138*b* and 138*c* to recognize that the images 138*b* and 138*c* depict the state 124, that the vehicle is present and plugged in.

After determining that the similarity score 122 does not meet a similarity threshold, the monitoring state module 104 may obtain new image data and reanalyze the new image data (112*c*). The new image data may be sent to the monitoring server 102 in response to the monitoring server 102 sending a request for new image data to the control unit 130. The new image data may correspond to the same portion of the monitored property as the image data 136. The new image data may be acquired by the same one or more cameras that were used to acquire the image data 136. The new image data may correspond to the same type of monitoring as the image data 136.

After analyzing the new image data, the monitoring state module 104 may again determine if there is sufficient state similarity (110) based on the determined states for analyzed images within the new image data. If there is sufficient state similarity, the monitoring state module 104 may confirm the state 124 (114) as the state most prevalent among the determined states for analyzed images within the new image data.

In some implementations, where the monitoring state module 104 determines that there is sufficient state similarity based on the determined states for images within the new image data, the monitoring state module 104 uses the image data 136 to train the one or more of the machine learning models that were used to analyze the images 138*a-d*. For example, where new image data is used to confirm the state 124 corresponding to the image data 136 (and the new image data), the monitoring state module 104 may train the one or more machine learning models with the images 138*b* and 138*c* to recognize that the images 138*b* and 138*c* depict the state 124, that the vehicle is present and plugged in.

Once the state 124 is confirmed as the state corresponding to the image data 136, the monitoring state module 104 determines if the state 124 matches a prior state 126. The prior state 126 may be the immediately preceding state, e.g., the last confirmed state for the particular portion of the monitored property corresponding to the image data 136, the last confirmed state for image data acquired using the one or more cameras that were used to acquire the image data 136, or the last confirmed state for the type of monitoring that corresponds to the image data 136. For example, the prior state 126 may have been that the vehicle is present and not plugged in. Accordingly, the monitoring state module 104 would determine, in this instance, that the state 124 does not match the state 126.

Where the monitoring state module 104 determines that the state 124 does match the state 126, the monitoring state module 104 may determine that no event has occurred. When no event has occurred, the monitoring state module 104 may not generate and send a notification to one or more users. When no event has occurred, the monitoring state module 104 may proceed to analyze different image data. This different image data may be image data that was placed in a queue. This different image data may be requested by the monitoring state module 104 in response to no event being detected. This different image data may be acquired by the control unit 130 based on a monitoring schedule set by one or more users. For example, a user may schedule that the garage be monitored at 9:00 am (typically after the user leaves the monitored property with the vehicle) and again at 8:00 pm (typically when the vehicle is back in the garage and is unlikely to be used for the rest of the night).

Where the monitoring state module 104 determines that the state 124 does not match the state 126, the monitoring state module 104 may determine that an event has occurred. When an event has occurred, the monitoring state module 104 may generate and send a notification 128 of the state change (118), e.g., of the event. The notification 128 may indicate the current state 124 only. For example, the notification 128 may specify that the "[v]ehicle is present and plugged in." The notification 128 may indicate the prior state 126 and the current state 124. The notification 128 may indicate that the state has changed from the prior state 126 to the current state 124. The notification 128 may indicate the particular event that has occurred based on the differences between the prior state 126 and the current state 124. For example, where the prior state 126 is that the vehicle is present and not plugged in, and the current state 124 is that the vehicle is present and plugged in, the monitoring state module 104 may determine that the event is that the vehicle has been plugged in. The monitoring state module 104 may proceed to generate and send a notification to the user stating that "the vehicle has been plugged in."

The monitoring state module 104 may send the notification 128 to one or more users, e.g. occupants of the monitored property. The notification 128 may be an email, text message (e.g., SMS, MMS, etc.), instant message, app notification, etc.

In addition to the notification 128 or in place of the notification 128, the monitoring state module 104 may perform one or more different actions. These actions may include sending recommendations to users, sending signals to one or more devices to cycle the power of the device or the power of a device connected to the device receiving the signal (e.g., in the case where power is cycled through a smart plug), sending signals to one or more devices to change a state of the device or to change a setting of the device, etc. For example, the monitoring state module 104 may send a signal to an energy monitoring device such as a Z-Wave module to switch off a circuit that provides power to an EV (e.g., through a charger) if it determines that the EV is not plugged in. Similarly, the monitoring state module 104 may send a signal to an energy monitoring device such as a Z-Wave module to switch on a circuit that provides power to an EV (e.g., through a charger) if it determines that the EV has been plugged in. These actions may help to avoid tripping a circuit breaker.

As another example, the monitoring state module 104 may identify a state change or event when it determines a change to the comfort of a property, e.g., when it detects that environment conditions of the property have changed. In these cases, the monitoring state module 104 may send one or more recommendations to users, and/or may send one or more signals to a smart thermostat, a smart HVAC system, etc. to adjust for the state change or event. For example, the monitoring state module 104 may determine a state change or event based on a combination of factors such as outdoor temperature, indoor temperature, change in indoor temperature (e.g., in the last 15 minutes), and the state of the windows/doors as determined by examining data from the cameras, temperature sensor(s), and/or magnetic sensors of the sensors 134 shown in FIGS. 1-2. If the monitoring state module 104 determines that the temperature inside the house is too hot (or is likely to become too hot based on one or more windows or doors being open), the monitoring state module 104 may send a recommendation to the users indicating, for example, that the windows and/or doors should be closed. In addition or alternatively, the monitoring state module 104 may automatically send a signal to a smart thermostat to turn on the air conditioning unit of the property, and/or decrease the temperature setting of the smart thermostat.

In some implementations, the monitoring server 102 (e.g., through the monitoring state module 104) may automatically adjust the one or more machine learning models used to analyze the image data 136. For example, the monitoring server 102 can store image data that has been labeled by a user with ground truth, e.g. obtained after the monitoring state module 104 requests feedback from a user. The monitoring server 102 might not immediately incorporate this labeled image data or ground truth into the one or more machine learning models. The monitoring server 102 may occasionally evaluate the frequency of failure of a machine learning model with known good data (e.g., images that are known to depict a particular state). That is, the monitoring server 102 may determine the percentage that a machine learning model of the one or more machine learning models fails to correctly assess the state depicted in image data depicting a known state. If the frequency of failure of the machine learning model meets a particular threshold (e.g., fails more than 40%, 35%, 30%, 25%, etc. of the time), the monitoring server 102 may feed the machine learning model new data such as stored image data that has been labeled by a user and/or corresponding ground truth.

In some implementations, the monitoring server 102 (e.g., through the monitoring state module 104) uses multiple machine learning models in analyzing the image data 136. The monitoring server 102 may train and evaluate numerous machine learning models using different machine learning approaches based on the same labeled image data (e.g., image data that has been labelled by one or more users with ground truth). The monitoring server 102 may proceed to automatically test or evaluate those machine learning models to determine the best model or combination of models/algorithms to use when determining the state depicted in a given set of images, e.g., when analyzing the image data 136. The monitoring server 102 may test or evaluate the machine learning models by determining their frequency in failing to correctly identify a state when provided image data depicting a known state. This allows the monitoring server 102 to determine which of the machine learning models is the most accurate or the best, or the top performing machine learning models (e.g., the top three most accurate machine learning models). The monitoring server 102 may proceed to use, e.g., through the monitoring state module 104, the best machine learning model to analyze the image data 136, or may use the top performing machine learning models to analyze the image data 136.

In some cases, the best model could be training two models that collectively provide a highly predictive model. For example, the monitoring server 102 may determine that Model A is correct 78% of the time and that Model B is correct 64%. The monitoring server 102 may proceed to also evaluate Model A and Model B collectively and determine that when both models agree on a state, they're correct 98% of the time. The monitoring server 102 may proceed to use Model A and Model B collectively when analyzing the image data 136, e.g., through the monitoring state module 104.

Figure 2:
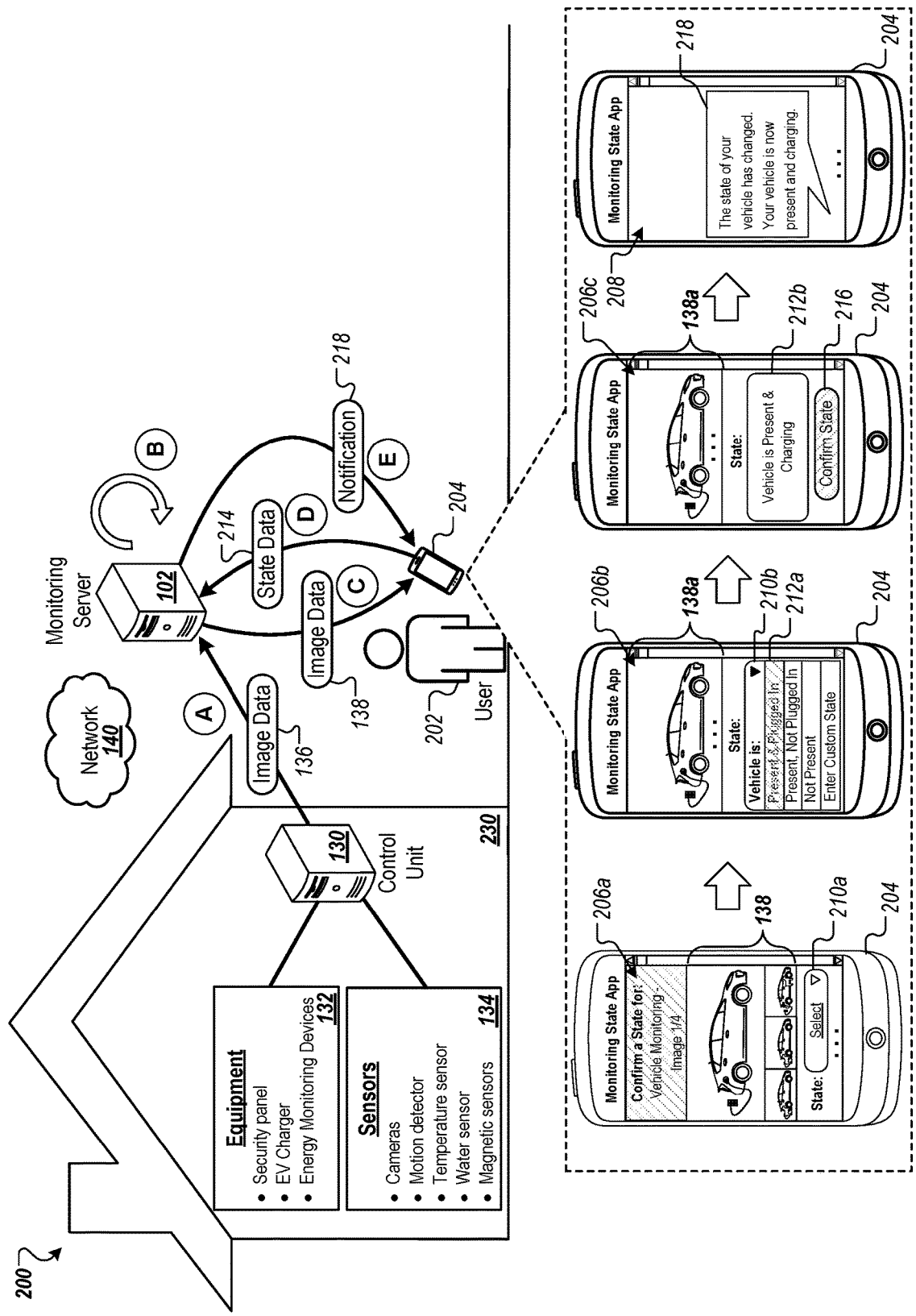
FIG. 2 is a diagram showing an example of a system for state and event monitoring.

FIG. 2 is a diagram showing an example of a system 200 for state and event monitoring. The system 200 includes the monitoring server 102, the control unit 130, the security equipment 132, the security sensors 134, and a user device 204 of a user 202. The equipment 132 and sensors 134 may be installed at the property 230. Various components of the system 200 may communicate over the network 140. In some implementations, the system 200 is the system 100 shown in FIG. 1.

The user device 204 may be a computing device such as, for example, a smart phone, a mobile phone, a laptop computer, a desktop computer, a tablet, etc.

FIG. 2 also illustrates a flow of data, shown as stages (A) to (D), with each representing a step in an example process. Stages (A) to (D) may occur in the illustrated sequence, or in a sequence that is different from the illustrated sequence. For example, some of the stages may occur concurrently.

In stage (A), the control unit 130 sends the image data 136 to the monitoring server 102 over the network 140. As described above, the image data 136 may be a video clip or a set of images. The image data 136 may have been acquired using one or more cameras of the sensors 134.

In stage (B), the monitoring server 102 processes the image data 136 in order to determine a current state corresponding to the image data 136. As described above with respect to FIG. 1, processing the image data 136 may involve an analyzing multiple images within the image data 136 and determining if there is sufficient state similarity.

In stage (C), based on processing the image data 136, the monitoring server 102 sends the image data 138 to the user device 204. The monitoring server 102 may send the image data 138 to the user device 204 in response to determining that there is not sufficient state similarity. The image data 138 may be sent to the user device 204 over the network 140. The image data 138 include the images 138a-d shown in FIG. 1. The image data 138 may be a subset of images sampled from the image data 136. The image data 138 may be the image data 136.

In addition to sending the image data 138, the monitoring server 102 may send a request along with the image data 138 to the user device 204. The request may indicate that the user 202 should provide input confirming the state corresponding to the image data 136 based on the provided image data 138.

The image data 138 may be presented on an interface 206a of the user device 204. The interface 206a may allow the user 202 to view each of the images within the image data 138. The interface 206a may include a menu 210a.

Upon selection of the menu 210a, the user 202 may be presented the interface 206b of the user device 204. The interface 206b may continue to display one or more images within the image data 138, such as the image 138a. The interface 206b displays an expanded view of the menu 210b. The expanded menu 210b is populated with preexisting states from which the user 202 can choose. One or more of the preexisting states may have been previously entered by the user 202. One or more of the preexisting states may have been preset or prepopulated (e.g., on the monitoring server 102). The preexisting states displayed on the interface 206b may be those that correspond to a particular area of the property 230 corresponding to the image data 136, those that correspond to one or more cameras that were used to acquire the image data 136, or those that correspond to a particular type of monitoring corresponding to the image data 136. The user 202 may also select to enter a new or custom state if the correct state is not listed within the menu 210b. Here, the user 202 has selected that the state 212a, that the vehicle is present and plugged in, from the menu 210b.

In response to selecting the state 212a, the user 202 may be presented the interface 206c. The interface 206c may continue to display one or more images of the image data 138 and the selected state 212b. The interface 206c may also display an interface element 216 (e.g., a button) which the user 202 may operate to confirm that the selected state 212b is the correct state, e.g., the state that represents the image data 136. Here, the user 202 selects the interface element 216.

As an example, if the user 202 had selected to enter a custom state, they could have been presented one or more fields where they could have entered the custom state. The one or more fields may allow the user 202 to type a custom state (e.g., "vehicle 1 is present and plugged in, vehicle 2 is not present"). There may be multiple fields where the user 202 enters a separate portion of the state into each of the fields. For example, there may be a first field where the user provides that a first vehicle is present (e.g., "vehicle 1 is present"), a second field where the user provides that the first vehicle is plugged in (e.g., "vehicle 1 is plugged in"), and a third field where the user provides that a second vehicle is not present (e.g., "vehicle 2 is not present").

In stage (D), in response to selecting the interface element 216, the user device 204 sends state data 214 to the monitoring server 102. The state data 214 may be sent to the monitoring server 102 over the network 140. The state data 214 may include an indication of the selected state 212. The monitoring server 102 may use the state data 214 to confirm that state 212 corresponding to the image data 136. The monitoring server 102 may also use the state data 214 to update or train one or more machine learning models used while processing the image data 136.

As described above with respect to FIG. 1, after confirming the state corresponding to the image data 136, the monitoring server 102 may determine if the state 212 matches a prior state. Here, the monitoring server 102 determines that that the state 212 does not match the prior state. Accordingly, the monitoring server 102 determines that an event or state change has occurred.

In stage (E), in response to detecting an event or state change, the monitoring server 102 may generate and send a notification 218 to the user device 204. The notification 218 may be sent to the user device 204 over the network 140. The notification 218 may be an email, text message (e.g., SMS, MMS, etc.), instant message, app notification, etc. The notification 218 may indicate the 212 only. For example, the notification 218 may specify that the "[v]ehicle is present and plugged in." The notification 218 may indicate the prior state and the state 212. The notification 218 may indicate that the state has changed from the prior state to the state 212. The notification 218 may indicate the particular event that has occurred based on the differences between the prior state and the state 212.

Here the notification 218 is displayed on the interface 208 of the user device 204 as an in-app message or notification.

In some cases where non-visual data is used with visual data to determine a state of the property 230 or to verify a state of the property 230 (e.g., at a particular point in time), the system 200 generates a model that is better able to predict and/or identify the state of the property 230. For example, the monitoring server 102 may generate a model (e.g., machine learning model) with improved state prediction/identification by building new models that contain different data sets to attempt to identify data sets that meaningfully improve the model. The model and/or the new models may receive as input visual data (e.g., captured images) as well as non-visual data, such as user input or feedback and/or other sensor data (e.g., sensor data that indicates current electricity usage in the property 230 or electricity usage at a particular area of the property 230, such as the usage at a particular outlet using a smart outlet). For instance, in the illustrated example of determining whether the vehicle is plugged in, a machine learning model that incorporates visual evidence (e.g., captures images), the total current electricity usage of the property 230 (e.g., from a current transformer (CT) clamp or similar), and an indication of whether or not the AC was on (e.g., from a connected thermostat) could be used to predict/identify whether the vehicle is plugged in more accurately than could be determined using visual data alone. The monitoring server 102 may also do analysis to determine how these elements should be weighted to provide the best outcome (e.g., perform optimization). In a system where a connected thermostat wasn't present, that data source could conceivably be replaced by public local weather data (e.g., acquired by the monitoring server 102 from an external computing system, such as an external server that stores weather data).

Figure 3:
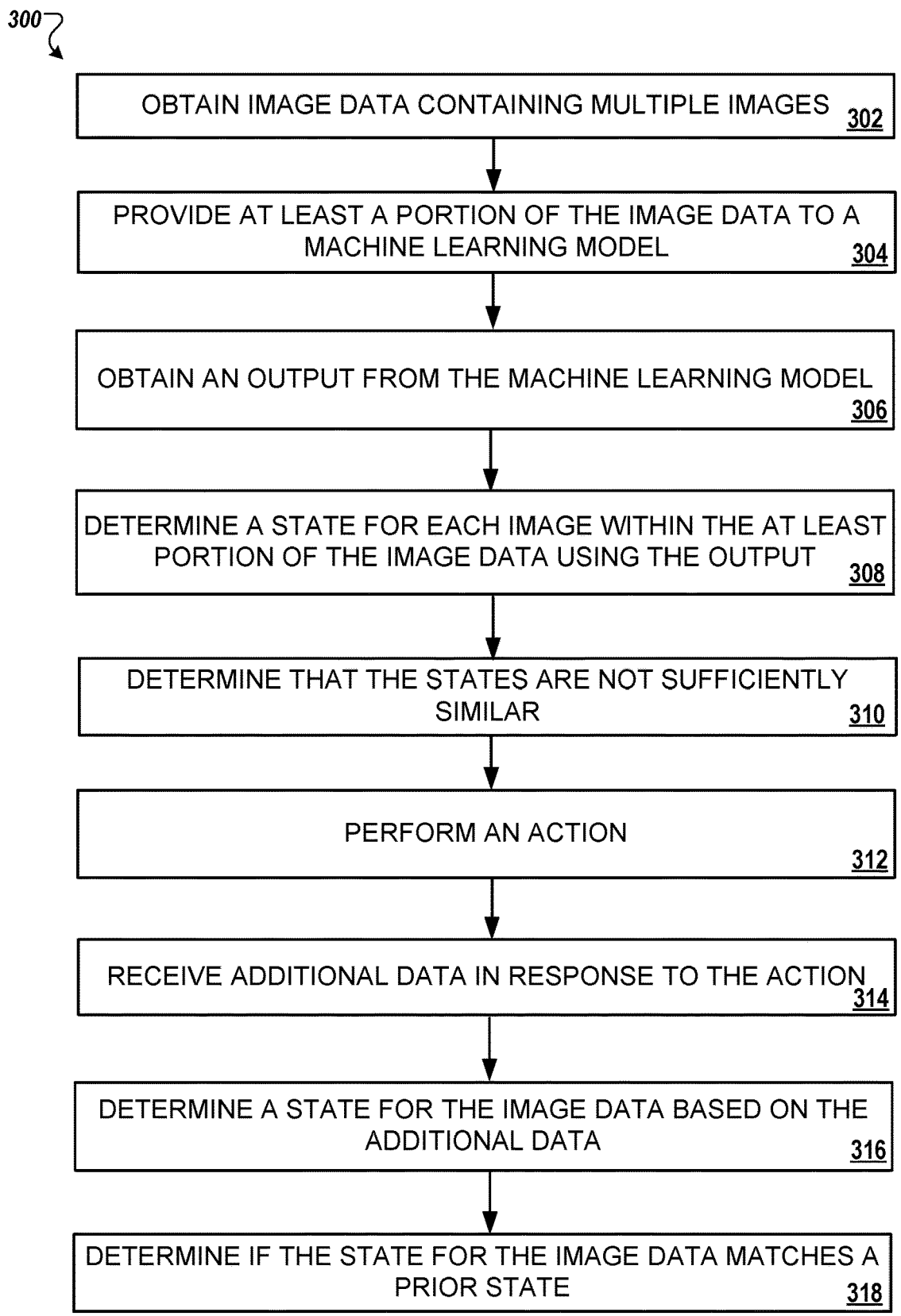
FIG. 3 is a flow diagram illustrating an example process for state and event monitoring.

FIG. 3 is a flowchart illustrating an example process 300 for state and event monitoring. The process 300 can be performed, at least in part, using the system 100 described in FIG. 1, the system 200 described in FIG. 2, or the home monitoring system 500 described in FIG. 5. For example, the process 300 can be performed using the monitoring server 102 shown in FIGS. 1-2.

The process 300 includes obtaining image data containing multiple images (302). For example, the image data may be the image data 136 shown in FIGS. 1-2. The image data may be the image data 138 shown in FIG. 2. The image data may be acquired from one or more cameras of the sensors 134 shown in FIGS. 1-2. The image data may contain images of a particular portion of a monitored property (e.g., a garage, a living room, a foyer, etc.).

The process 300 includes providing at least a portion of the image data to a machine learning model (304). The machine learning model may be used in analyzing all or part of the image data. All or a portion of the image data may be provided to the machine learning model as input to the machine learning model. With respect to the FIG. 1, the machine learning model may be part of the monitoring state module 104. With respect to FIG. 1, all or a portion of the image data may be the images 138a-d. With respect to FIG. 2, all or a portion of the image data may be the image data 138.

The process 300 includes obtaining an output from the machine learning model (306). The output of the machine learning model may be one or more confidence scores. For example, with respect to FIG. 1, the output of the machine learning model may include a confidence score for each of the possible states (e.g., 95% for a first state and 5% for a second state).

The process 300 includes determining a state for each image within the at least portion of the image data using the output (308). For example, with respect to FIG. 1, the monitoring state module 104 determines the state 120a corresponding to the image 138a of the image data 136, the state 120b corresponding to the image 138b of the image data 136, the state 120c corresponding to the image 138c of the image data 136, and the state 120d corresponding to the image 138d of the image data 136. In determining a state for each image, the monitoring state module 104 may compare the output of the machine learning model (e.g., the confidence score(s)) with a threshold. If the output indicates that a particular state meets the threshold, the monitoring state module 104 determines that the particular state corresponds to the image being analyzed.

The process 300 includes determine that the states are not sufficiently similar (310). With respect to FIG. 1, in determining if there is sufficient state similarity, the monitoring state module 104 first determines a similarity score 122 (e.g., a percentage indicative of similarity or agreement) between the states 120a-d. For example, if the monitoring state module 104 analyzes four images and all four images have matching states, then the similarity score 122 would be 100%. If three images of the four images having matching states, then the similarity score 122 would be 75%. If two images of the four images having matching states, then the similarity score 122 would be 50%. If all four images have different states, then the similarity score 122 would be 0%. Next, the monitoring state module 104 compares the similarity score 122 to a similarity threshold in order to determine if the states are sufficiently similar. For example, the monitoring state module 104 may compare the similarity score 122 of 50% to a similarity threshold of 60%, and determine that the states are not sufficiently similar since the similarity score 122 does not meet the similarity threshold.

The process 300 includes performing an action (312). For example, with respect to FIG. 1, because the similarity score 122 does not meet the similarity threshold, the monitoring state module 104 may perform one or more optional actions 112a-c. These actions may include accessing or requesting sensor and/or equipment data, requesting input from a user, and obtaining (or requesting) and reanalyzing new image data.

The process 300 includes receiving additional data in response to the action (314). With respect to FIG. 1, this additional data may include sensor and/or equipment data, new image data, or input from one or more users. The input from the one or more users may indicate a correct state for the image data.

The process 300 includes determining a state for the image data based on the additional data (316). For example, with respect to FIG. 1, the monitoring state module 104 may use the accessed sensor and/or equipment data, the input from the user, or the new image data to confirm the state 124 corresponding to the image data 136.

The process 300 includes determining if the state for the image data matches a prior state (318). For example, with respect to FIG. 1, the prior state 126 may be the immediately preceding state, e.g., the last confirmed state for the particular portion of the monitored property corresponding to the image data 136, the last confirmed state for image data acquired using the one or more cameras that were used to acquire the image data 136, or the last confirmed state for the type of monitoring that corresponds to the image data 136.

In cases where it is determined that the state for the image data matches a prior state, the monitoring state module 104 shown in FIG. 1 may determine that no event or state change has occurred. In these cases, the monitoring state module 104 may not send a user a notification or perform a different action.

In cases where it is determined that the state for the image data does not match a prior state, the monitoring state module 104 shown in FIG. 1 may determine that an event or state change has occurred. In these cases, the monitoring state module 104 may generate and send a notification to one or more users. The notification may indicate the state change or event that has occurred. In addition to or in place of the notification, the monitoring state module 104 may perform one or more other actions. For example, the monitoring state module 104 may send a signal to an energy monitoring device such as a Z-Wave module to switch off a circuit that provides power to an EV (e.g., through a charger) if it determines that the EV is not plugged in. Similarly, the monitoring state module 104 may send a signal to an energy monitoring device such as a Z-Wave module to switch on a circuit that provides power to an EV (e.g., through a charger)

if it determines that the EV has been plugged in. These actions may help to avoid tripping a circuit breaker.

As another example, the monitoring state module 104 may identify a state change or event when it determines a change to the comfort of a property, e.g., when it detects that environment conditions of the property have changed. In these cases, the monitoring state module 104 may send one or more recommendations to users, and/or may send one or more signals to a smart thermostat, a smart HVAC system, etc. to adjust for the state change or event. For example, the monitoring state module 104 may determine a state change or event based on a combination of factors such as outdoor temperature, indoor temperature, change in indoor temperature (e.g., in the last 15 minutes), and the state of the windows/doors as determined by examining data from the cameras, temperature sensor(s), and/or magnetic sensors of the sensors 134 shown in FIGS. 1-2. If the monitoring state module 104 determines that the temperature inside the house is too cold (or is likely to become too cold based on one or more windows or doors being open), the monitoring state module 104 may send a recommendation to the users indicating, for example, that the windows and/or doors should be closed. In addition or alternatively, the monitoring state module 104 may automatically send a signal to a smart thermostat to turn on the heat, and/or increase the temperature setting of the smart thermostat.

Figure 4:
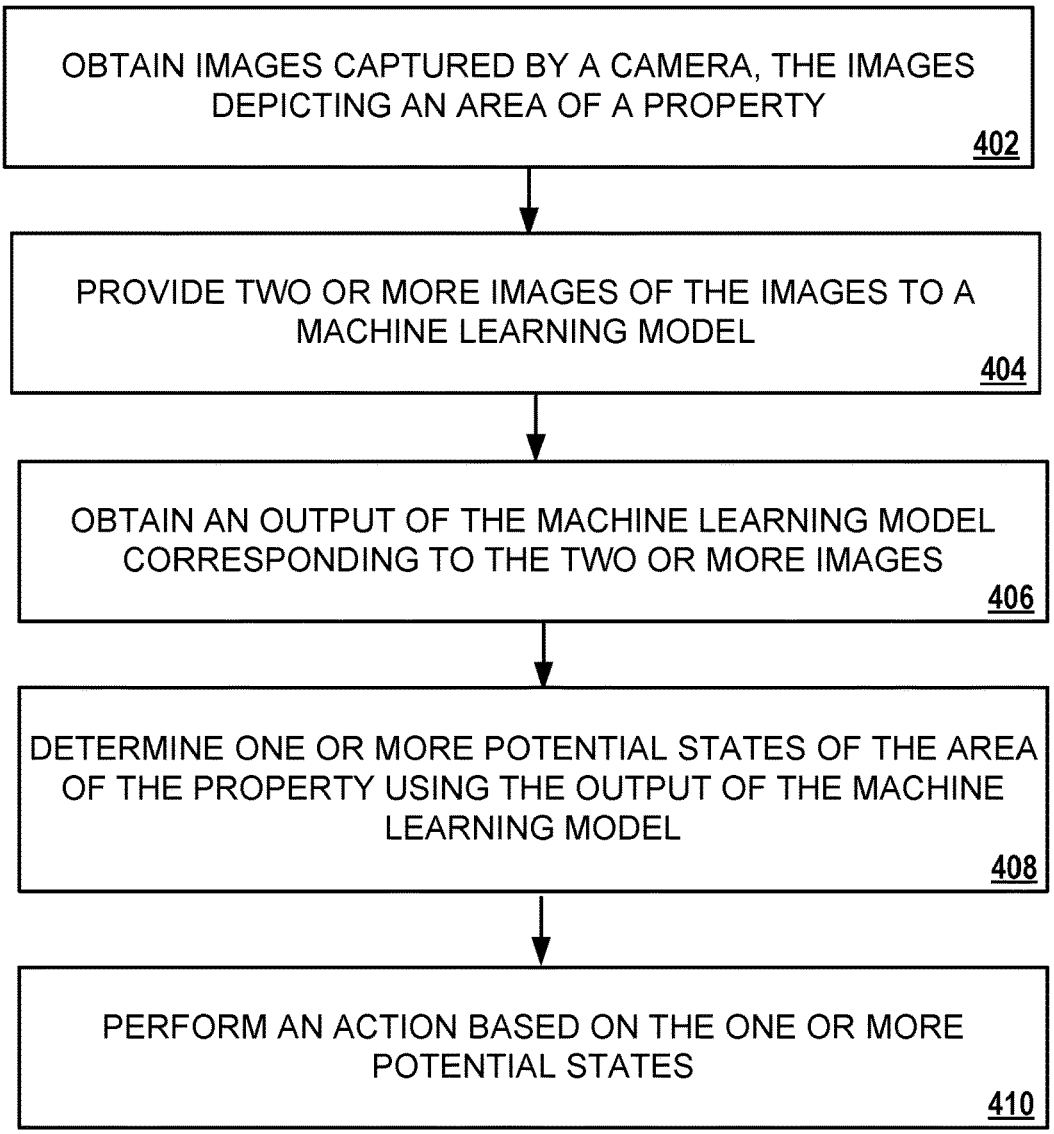
FIG. 4 is a flow diagram illustrating an example process for state and event monitoring.

FIG. 4 is a flowchart illustrating an example process 400 for state and event monitoring. The process 400 can be performed, at least in part, using the system 100 described in FIG. 1, the system 200 described in FIG. 2, or the home monitoring system 500 described in FIG. 5. For example, the process 400 can be performed using the monitoring server 102 shown in FIGS. 1-2.

The process 400 includes obtaining images captured by a camera, the images depicting an area of a property (402). For example, the images may be the image data 136 shown in FIGS. 1-2. The images may be the image data 138 shown in FIG. 2. The images may be acquired from one or more cameras of the sensors 134 shown in FIGS. 1-2. The image data may contain images of a particular area of a monitored property, such as garage, a living room, a foyer, etc. The area of the property being monitored may be an area of the property that a user has indicated through the user device 204 to be monitored. Similarly, the area of the property being monitored may be an area of the property where an event has recently been detected, e.g., using the equipment 132 and/or the sensors 134.

Obtaining the image data may include the monitoring server 102 requesting a subset of recently acquired images from the control unit 130. The monitoring server 102 may additionally or alternatively generate and send instructions to the control unit 130 (or directly to one or more cameras of the sensors 134) for the control unit 130 to capture a subset of images using one or more of the cameras in the sensors 134. Obtaining the image data may additionally or alternatively include the monitoring server 102 receiving a subset of images, e.g., from the control unit 130, the user device 204, etc. The monitoring server 102 may receive the subset of images in response to a user requesting through the user device 204 a current state for the area of the property. Similarly, the monitoring server 102 may receive the subset of images in response to one or more detected events, e.g., detected using the sensors 134 and/or the equipment 132. For example, a motion detector of the sensors 134 may detect motion and send corresponding data to the control unit 130. In response, the control unit 130 may instruct the cameras of the sensors 134 to capture a subset of images.

Once the control unit 130 receives the images, it may transmit the images over the network 140 as part of the image data 136.

The process 400 includes providing two or more images of the images to a machine learning model (404). The machine learning model may be used in analyzing all or a portion of the images. The monitoring server 102 may provide all of the images or a subset of the images (e.g., a particular number of images of the images such as particular number of images randomly selected from the images or a particular number of the most recently required images of the images, a particular number images that meet certain quality parameters required for analysis, etc.) as input to the machine learning model. With respect to the FIG. 1, the machine learning model may be part of the monitoring state module 104. As an example, the two or more images may be the images 138*a*-*d*. With respect to FIG. 2, the two or more images may be the image data 138.

The process 400 includes obtaining an output from the machine learning model corresponding to the two or more images (406). The output of the machine learning model may be one or more confidence scores, or numerical data that can be converted to confidence scores. The machine learning model may output one or more confidences for each image of the two or more images. Each of the confidences may correspond to a particular state for the area of the property, or a particular condition for the area of the property (e.g., where a unique state is formed from one or more conditions). For example, with respect to FIG. 1, the output of the machine learning model may include a confidence score for each of the possible states (e.g., 95% for a first state and 5% for a second state). Specifically, the output of the machine learning model may indicate a 95% confidence for a first state that the vehicle is present and plugged in, and a 5% confidence for a second state that the vehicle is present and is not plugged in.

Additionally or alternatively, the output of the machine learning model may indicate confidences corresponding to different conditions. For example, the output of the machine learning model may indicate with greater than 99% confidence that the vehicle is present, 95% confidence that the vehicle is plugged in, and 5% confidence that the vehicle is not plugged in. The monitoring server 102 may use the confidences associated with the different conditions to calculate confidences for each of the possible states, e.g., a first state where the vehicle is present and plugged in (e.g., 95%), a second state where the vehicle is present and not plugged in (e.g., 5%), and a third state where the vehicle is not present (e.g., less than 1%).

In some cases, multiple machine learning models are used to generate the output. For example, a different machine learning model may be used for each potential state of the area of the property. Additionally or alternatively, a different machine learning model may be used for each potential condition for the area of the property. For example, the two or more images may be provided to a first machine learning model that corresponds to the condition of whether a vehicle is present in the garage area of the property. The two or more images may also be provided to a second machine learning model that corresponds to the condition of whether the vehicle is plugged into an electric charger or outlet. Here, the output may include both the output of the first machine learning model and the output of the second machine learning model.

In some cases, the machine learning model is a classifier machine learning model. For example, the output of the machine learning model may indicate the state of the area of the property (e.g., without corresponding confidences). The output of the machine learning model may be a value that corresponds to a particular state from two or more possible states for the area of the property. For example, an output value of 0.24 may correspond to a first state (e.g., identified by a value range of 0.11-0.28) where the vehicle is present and is plugged in. As another example, multiple machine learning models may be used to generate the output. Each of the machine learning models may be a binary classifier machine learning model such that the output of each of the machine learning models indicates whether a certain condition is currently met in the area of the property or not. For example, the machine learning models may include a binary classifier that corresponds to the condition of whether the vehicle is plugged in or not. The output of the binary classifier generated in response to receiving the image 138a as input may be a value that corresponds to the positive response that the condition of the vehicle being plugged in is met.

As an example, images may only be provided to this binary classifier based on the output of another binary classifier, such as a binary classifier corresponding to the condition of whether the vehicle is present. For example, after providing the image 138a to the binary classifier corresponding to the condition of whether the vehicle is present, the monitoring server 102 may only provide the images 138a to the binary classifier corresponding to the condition of whether the vehicle is plugged in if the output of the previous binary classifier indicates that the vehicle is present in the garage of the property.

The process 400 includes determining one or more potential states of the area of the property for each image within the at least portion of the image data using the output (408). For example, with respect to FIG. 1, the monitoring state module 104 determines the state 120a corresponding to the image 138a of the image data 136, the state 120b corresponding to the image 138b of the image data 136, the state 120c corresponding to the image 138c of the image data 136, and the state 120d corresponding to the image 138d of the image data 136. In determining a state for each image, the monitoring state module 104 may compare the output of the machine learning model (e.g., the confidence score(s)) to one or more thresholds. If the output indicates that a particular state meets the threshold, the monitoring state module 104 determines that the particular state corresponds to the image being analyzed. If, however, the output indicates that no particular state of a given image meets the threshold, then the monitoring state module 104 may determine that a state cannot be determined for the particular image with sufficient confidence. The monitoring state module 104 may ignore this image and/or the potential states of this image in determining if there is sufficient state similarity. For example, if the threshold confidence for an image state is set to 80%, the monitoring state module 104 may ignore the images 138b-138c and their corresponding states 120b-120c when determining if there is sufficient state similarity. This would result in only the images 138a and 138d and their corresponding states 120a and 120d being considered by the monitoring state module 104, which would result in a 100% state match.

In some cases, determining one or more potential states of the area of the property includes determining two or more states corresponding to the two or more images. For example, the monitoring server 102 may determine the states 120a-120d corresponding to the images 138a-138d, respectively. The process 400 optionally includes determining that the two or more states are not sufficiently similar.

For example, the monitoring server 102 may compare the states 120a-120d to one another to find the matching states. The monitoring server 102 may use the results of the comparison to calculate a state similarity score 122. For example, the monitoring server 102 may determine that determine that the state similarity score is 0.50 based on the state 120a matching the state 120d, and/or on the state 120b matching the state 120c.

In some cases, determining that the two or more states are not sufficiently similar includes: for each of the two or more images, determining, from the output of the machine learning model, a confidence for one or more potential states corresponding to the respective image; for each of the two or more images, (i) selecting a state for the respective image from the one or more potential states based on the confidences corresponding to one or more potential states or (ii) determining that no state can be identified with sufficient confidence for the respective image based on the confidences corresponding to one or more potential states, wherein the two or more states are the selected states; calculating a similarity score for the two or more images based on the two or more states; and determining that the similarity score corresponding to the two or more images fails to meet a threshold similarity score.

As an example, the monitoring server 102 may use the output of the machine learning model to identify a first confidence of 95% for a first state 120a of the garage that that the vehicle is present and plugged in from the first image 138a, and a second confidence of 5% for second state of the garage that the vehicle is present and not plugged in. The monitoring server 102 may determine that the first state 120a should be associated with the image 138a over the second state based on, for example, the first state corresponding to a confidence that is higher than a confidence associated with the second state, and/or based on the confidence corresponding to the first state meeting a threshold level of confidence (e.g., and the confidence corresponding to the second state not meeting the threshold level of confidence). After calculating the similarity score 122 of 0.50, the monitoring server 102 may compare the similarity score 122 to a similarity score threshold of 0.60 to determine that the similarity score 122 does not meet the similarity score threshold. In response, the monitoring server 102 may perform one or more actions to obtain additional information as discussed in more detail below.

In some cases, calculating the similarity score for the two or more images includes determining a highest number of state matches for a particular state in the two or more states, and calculating a similarity score using the highest number of state matches. For example, with respect to FIG. 1, the monitoring server 102 may identify the highest number of state matches for a particular state as two based on the states 120a and 120d matching, and the states 120b and 120c matching. The resulting similarity score can be indicative of a comparison between the highest number of state matches and a total number of states in the two or more states. For example, the monitoring server 102 may calculate the similarity score 122 by dividing the highest number of state matches of two by the total number of states (e.g., four) to determine a state similarity of 0.50 or 50%. The total number of states may be those states associated with a particular image and a particular confidence that meets a threshold confidence.

In some cases, determining that no state can be identified with sufficient confidence for the respective image includes determining, for the respective image, that none of the confidences associated with the one or more potential states meet a threshold confidence. For example, the monitoring server 102 may apply a confidence threshold to each of the state confidences associated with a particular image. If none of the state confidences meet the confidence threshold, the monitoring server 102 may determine that the particular image should not be used for determining a current state of the area of the property, and/or the corresponding states of the image should not be used for calculating a similarity score.

The process 400 includes performing an action based on the one or more potential states (410). Performing an action based on the one or more states may include, for example, the monitoring server 102 requesting user input, obtaining sensor data, and/or obtaining and analyzing additional images. The resulting additional information may be used by the monitoring server 102 to determine the current state of the area of the property, or to verify the current state of the area of the property as a particular state of the one or more potential states (e.g., the state with the highest confidence, the state with the most state matches, etc.). For example, in response determining that there is not sufficient similarity among the one or more potential states, the monitoring server 102 may sensor data from an EV charger or from one or more energy monitoring devices (e.g., smart plugs) of the equipment 132 to confirm the state of the garage of the property that the vehicle is present and is plugged in. Notably, the sensor data may indicate that power is being drawn from the EV charger or an outlet, a threshold amount of power is being drawn from the EV charger or an outlet, and/or an amount of power is being drawn from the EV charger or an outlet that is consistent with a typical power draw of the vehicle or a range of possible/previously observed energy consumption. Using this sensor data, the monitoring server 102 may determine that the vehicle must be plugged in. The monitoring server 102 may further identify an additional condition that the vehicle is currently charging (e.g., versus the vehicle being plugged in and not charging).

In some cases, where external data obtained, the external data is used to update the machine learning model. For example, the monitoring system 102 may treat user responses and sensor data as feedback to train the machine learning model (e.g., in order to improve later accuracy in identifying states, conditions, etc.).

Performing an action based on the one or more potential states may include performing an action based on the calculated similarity score. For example, if the similarity score does not meet a threshold similarity score, then the monitoring server 102 may perform one or more actions to obtain additional data. Specifically, in response to the similarity score not meeting a threshold similarity score, the monitoring server 102 may request user input, obtain sensor data, and/or obtain and analyze additional images.

In some cases, obtaining external data includes, in response to the two or more states not being sufficiently similar, generating a request that queries a user to select the current state from among a list of potential states of the area of the property, or that queries the user to input the current state; transmitting the request to a user device of the user; and receiving a response to the request from the user device, the response indicating the current state of the area property. For example, the monitoring server 102 may generate a request that includes the images 138a-138d and queries the user to either select from among the states 120a-120d (or from among the two unique states in the states 120a-120d), to input the specific state of the garage of the property, and/or to indicate which possible conditions are currently true or false. Here, determining the current state of the area of the property using the external data can include determining the current state of the area of the property using the response. For example, if the received response indicates that the user has selected the state 120a, the monitoring server 102 may conclude that the current state of the garage of the property is that the vehicle is present and plugged in. The monitoring server 102 may use the response to update the machine learning model.

In some cases, generating the request that queries the user to select the current state from among the list of potential states of the area of the property includes generating a request that queries the user to select from each unique state in the two or more states, or each unique state in the two or more states that is associated with a confidence that meets a threshold confidence, receiving the response to the request from the user device includes receiving a response that includes a selection of a first unique state in the two or more states, and determining the current state of the area of the property using the response includes determining that the current state of the area of the property is the first unique state of the two or more states. For example, the monitoring server 102 may generate a request that includes an information to generate a first interface element corresponding to a first state of the vehicle being present and plugged in, a second state of the vehicle being present and not plugged in, and a third state of the vehicle not being present. The response from the user (e.g., transmitted from a user device of the user) may include an indication of a selection made by the user of one of the three potential states. The monitoring server 102 may use this selection to identify the current state of the area of the property.

In some cases, obtaining external data includes obtaining sensor data from one or more electronic devices, and determining the current state of the area of the property using the external data includes verifying a particular state of the two or more states as the current state of the area of the property using the sensor data. For example, the monitoring server 102 may obtain sensor data from a motion detector of the sensors 134 to determine if motion has recently been detected in the garage. The monitoring server 102 may use this information with other information such as stored information, e.g., a stored previous state (e.g., immediately preceding determined state) of the garage where the vehicle was not present, to conclude that the vehicle is present in the garage.

In some cases, obtaining external data includes obtaining schedule or pattern information. For example, the monitoring server 102 may access information that indicates if the vehicle is expected to be present in the garage at that the current time, if the typical driver for the vehicle is scheduled to be somewhere other than at the property at this time, etc. The monitoring server 102 may use this information to verify a state of the area of the property, and/or to adjust one or more confidences associated with the potential states of the area of the property.

In some cases, obtaining external data includes obtaining one or more new images, providing the one or more new images to the machine learning model, obtaining an new output of the machine learning model corresponding to the one or more new images, determining a new state of the area of the property using the new output of the machine learning model. For example, the monitoring server 102 can request a new set of images from the control unit 130, and analyze the new set of images using the techniques described above. The number of images obtained for the new set may be the same or different than that of the first set. For example, the monitoring server 102 may request two new images, compared to the four images 138a-138d in the original set.

Determining the current state of the area of the property using the external data can include verifying a particular state of the two or more states as the current state of the area of the property using the new state. For example, if a state identified for two new images is that the vehicle is present and plugged in, the monitoring server 102 may determine a new similarity score of 0.67 based on the newly identified states matching the state 120a and the state 120d. Because the new similarity score meets the similarity score threshold of 0.60, the monitoring server 102 may conclude that the current state of the garage of the property is that the vehicle is present and is plugged in.

In some cases, performing an action based on the calculated similarity score includes comparing the similarity score to one or more score ranges or threshold to identify a particular action to perform. For example, if the similarity score is at or under a first threshold but above a second threshold (e.g., corresponding to a slightly low similarity), the monitoring server 102 may obtain and analyze new images. If the similarity score is at or under the second threshold and above a third threshold (e.g., corresponding to moderately low similarity), the monitoring server 102 may obtain sensor data (e.g., other than images, or images from one or more different cameras) and use the sensor data to determine or verify the current state of the area of the property. If the similarity score is at or under the second threshold and above a third threshold (e.g., corresponding to very low similarity), the monitoring server 102 may generate a user request and transmit it to a user device. The monitoring server 102 may use the corresponding response to determine or verify the current state of the area of the property.

The process 400 optionally includes determining a prior state for the area of the property, determining that the prior state does not match the current state, and, based on the prior state not matching the current state, notifying a user device of a change in the state of the area of the property. For example, the monitoring server 102 may generate and transmit a notification to a user device of a user that indicates the current state of the area of the property (e.g., that the vehicle is currently present and plugged in) after determining that last determined state differs from the current state.

In some cases, determining the current state of the area of the property includes determining a device is present in the area of the property, determining that the prior state for the area of the property includes determining that device was previously not present in the area of the property, and notifying the user device of the change in the state of the area of the property includes transmitting a notice to the user device indicating at least one of the following: a change in state of the area of the property has occurred; the device was previously not present in the area of the property; and the device is currently present in the area of the property. For example, the monitoring server 102 may determine a current state that the vehicle is present in the driveway of the property, and access a previous state that the vehicle was not present in the driveway of the property. Based on the current state and the previous state not matching, the monitoring server 102 may generate and transmit a notification to a user device of the user indicating that a vehicle has pulled into the driveway of the property. The notification may include, for example, an image of the vehicle.

In some cases, determining the current state of the area of the property includes determining a device is in a first state, determining that the prior state for the area of the property includes determining that device was previously in a second state different from the first state, and notifying the user device of the change in the state of the area of the property includes transmitting a notice to the user device indicating at least one of the following: a change in state of the area of the property has occurred; the device was previously in the second state; and the device is currently in the first state. For example, the monitoring server 102 may determine a current state that an oven in a kitchen of the property is ON. The monitoring may access a previous state that indicated that the oven was previously OFF. Based on the current state and the previous state not matching, the monitoring server 102 may generate and transmit a notification to a user device of the user indicating that the oven has been turned ON. The notification may include one or more images that may indicate who or what is responsible for the change in state, e.g., for turning the oven ON.

In some cases, a notification may be generated and transmitted to a user device in response to determining that a current state has not changed for a threshold amount of time. For example, the monitoring server 102 may determine a current state that an oven in a kitchen of the property is ON and, in response, start a timer. If an accumulated time of the timer meets a threshold amount of time, the monitoring server 102 may, in response, generate and transmit a notification to a user device of the user indicating that the oven is ON, that the oven has been left ON for an unusual amount of time, or that the oven has been left ON for the amount of time last indicated by the timer (e.g., which may be kept running, or may be adjusted to account for transmission time to the user device).

The process 400 optionally includes determining a prior state for the area of the property, determining that the prior state does not match the current state, and, based on the prior state not matching the current state, generating instructions for one more external electronic devices to change a mode of the of the one or more electronic devices and transmitting the instructions to the one or more electronic devices. For example, in response to a current state of an oven in the kitchen of the property being ON and the previous state of an oven in the kitchen of the property being OFF, the monitoring server 102 may generate and transmit instructions to the oven to turn OFF or to a smart plug that that the oven receives power through to suspend the transfer of energy to the oven. A request to have a user confirm sending the instructions may be first send to a user device of the user and a corresponding response received prior to the instructions being sent. For example, the monitoring server 102 may request that a user confirm that the oven should be turned off, prior to sending instructions to the oven to turn OFF or to a smart plug that that the oven receives power through to suspend the transfer of energy to the oven.

In some cases, determining the current state of the area of the property includes determining a current environmental state of the area of the property, determining that the prior state for the area of the property includes determining a previous environment state of the area of the property different from the current environment state, generating instructions for one more external electronic devices to change a mode of the of the one or more electronic devices includes generating instructions for one or more of the following: an HVAC system of the property to adjust at least one of temperature or humidity of the area of the property; and motorized blinds of one or more windows of the property to lower or raise the motorized blinds.

In some cases, determining a current environmental state of the area of the property includes determining a current environment state of the area of the property based on sensor data indicating one or more of the following: outside temperature corresponding to the area of the property; inside temperature corresponding to the area of the property; rate of temperature increase or decrease corresponding to the area of the property; outside humidity corresponding to the area of the property; inside humidity corresponding to the area of the property; and rate of humidity increase or decrease corresponding to the area of the property.

The process 400 optionally includes determining a prior state for the area of the property, determining that the current state has not changed for a threshold amount of time, and, based on the current state not changing for the threshold amount of time, generating instructions for one more external electronic devices to change a mode of the of the one or more electronic devices and transmitting the instructions to the one or more electronic devices. For example, in response to a current state of an oven in the kitchen of the property being ON and having lasted for more than two hours, the monitoring server 102 may generate and transmit instructions to the oven to turn OFF or to a smart plug that that the oven receives power through to suspend the transfer of energy to the oven. A request to have a user confirm sending the instructions may be first send to a user device of the user and a corresponding response received prior to the instructions being sent. For example, the monitoring server 102 may request that a user confirm that the oven should be turned off, prior to sending instructions to the oven to turn OFF or to a smart plug that that the oven receives power through to suspend the transfer of energy to the oven.

Figure 5:
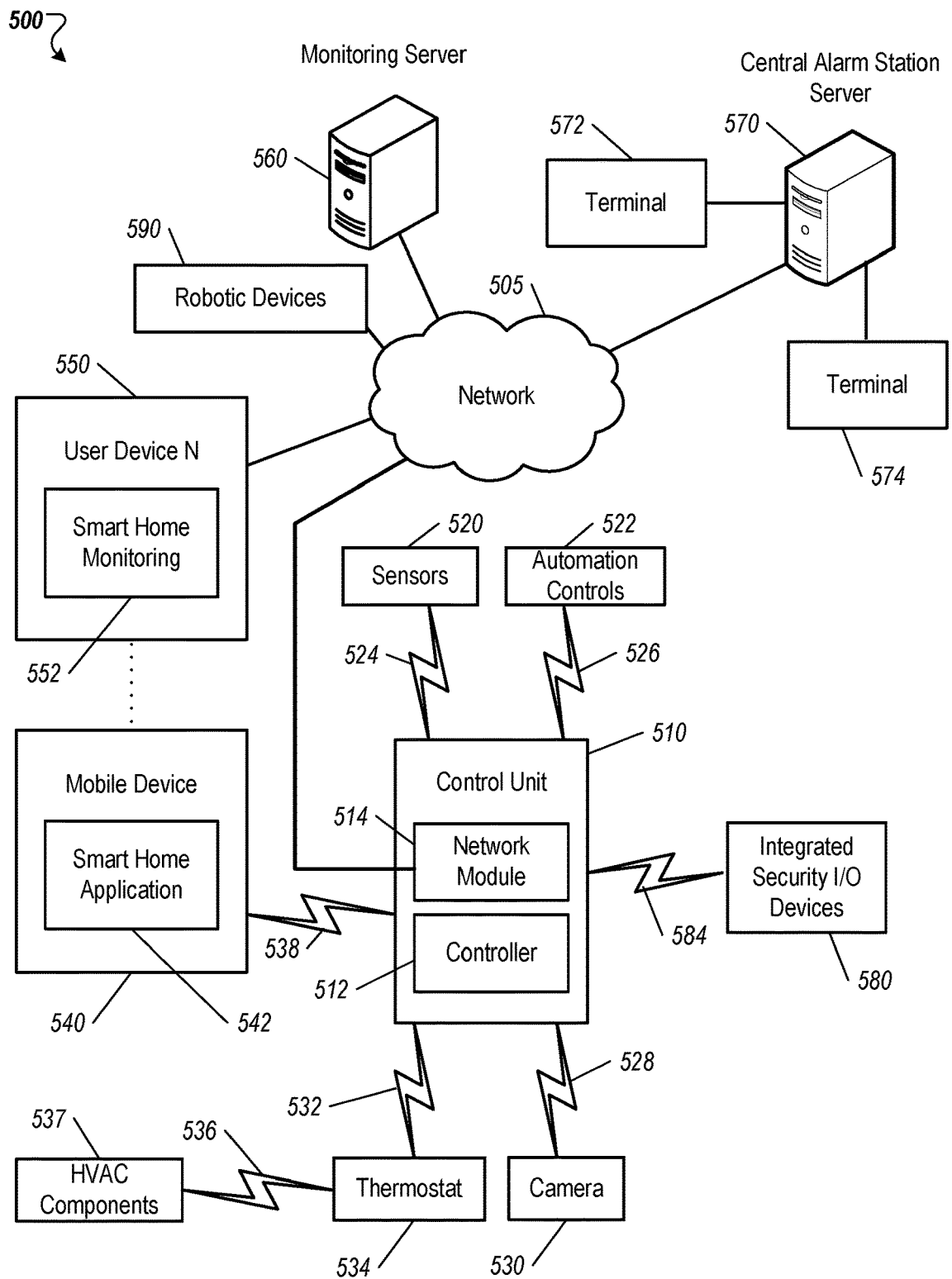
FIG. 5 is a block diagram illustrating an example security monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network. The network 505 may be a local network and include, for example, 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The network 505 may be a mesh network constructed based on the devices connected to the mesh network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller 512's power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 analyzes the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., user 108). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 are mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), other Powerline networks that operate over AC wiring, or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 are configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:
1. A computer-implemented method comprising:
obtaining images captured by a camera, the images depicting an area of a property;
providing two or more images of the images to a machine learning model;

obtaining an output of the machine learning model corresponding to the two or more images;

determining two or more potential states of the area of the property using the output of the machine learning model, each of the two or more potential states corresponding to an image in the two or more images;

determining that the two or more potential states are dissimilar using a threshold similarity score; and performing an action based on the two or more potential states not satisfying the threshold similarity score.

2. The method of claim 1, comprising determining that the two or more potential states do not satisfy the threshold similarity score, wherein performing the action comprises performing an action based on the two or more states not satisfying the threshold similarity score.

3. The method of claim 2, wherein:

determining that the two or more states do not satisfy the threshold similarity score comprises:

for each of the two or more images, determining, from the output of the machine learning model, a confidence for one or more potential states corresponding to a respective image;

for each of the two or more images, (i) selecting a state for the respective image from the one or more potential states based on the confidences corresponding to one or more potential states or (ii) determining that no state can be identified for the respective image based on the confidences corresponding to one or more potential states, wherein the two or more states are the selected states;

calculating a similarity score for the two or more images based on the two or more states; and determining that the similarity score corresponding to the two or more images does not satisfy the threshold similarity score.

4. The method of claim 3, wherein selecting the state for the respective image from the one or more potential states comprises selecting, for the respective image, a state from the one or more potential states associated with the highest confidence.

5. The method of claim 3, wherein selecting the state for the respective image from the one or more potential states comprises identifying, for the respective image, a state from the one or more potential states associated with a confidence that meets a threshold confidence.

6. The method of claim 3, wherein determining that no state can be identified for the respective image comprises determining, for the respective image, that none of the confidences associated with the one or more potential states meet a threshold confidence.

7. The method of claim 3, wherein calculating the similarity score for the two or more images comprises calculating a similarity score that indicates extent of state matches between the two or more states corresponding to the two or more images.

8. The method of claim 3, wherein calculating the similarity score for the two or more images comprises:

determining a highest number of state matches for a particular state in the two or more states; and calculating the similarity score using the highest number of state matches, wherein the similarity score is indicative of a comparison between the highest number of state matches and a total number of states in the two or more states.

9. The method of claim 2, wherein performing the action based on the two or more states not satisfying the threshold similarity score comprises obtaining external data, and the method comprises:

determining a current state of the area of the property using the external data.

10. The method of claim 9, wherein:

obtaining the external data comprises:

in response to the two or more states not satisfying the threshold similarity score, generating a request that queries a user to select the current state from among a list of potential states of the area of the property, or that queries the user to input the current state;

transmitting the request to a user device of the user; and receiving a response to the request from the user device, the response indicating the current state of the area of the property, and determining the current state of the area of the property using the external data comprises determining the current state of the area of the property using the response.

11. The method of claim 10, wherein:

generating the request that queries the user to select the current state from among the list of potential states of the area of the property comprises generating a request that queries the user to select from each unique state in the two or more states, or each unique state in the two or more states that is associated with a confidence that meets a threshold confidence, receiving the response to the request from the user device comprises receiving a response that includes a selection of a first unique state in the two or more states, and determining the current state of the area of the property using the response comprises determining that the current state of the area of the property is the first unique state of the two or more states.

12. The method of claim 9, wherein:

obtaining the external data comprises obtaining sensor data from one or more electronic devices, and determining the current state of the area of the property using the external data comprises verifying a particular state of the two or more states as the current state of the area of the property using the sensor data.

13. The method of claim 9, wherein:

obtaining the external data comprises:

obtaining one or more new images;

providing the one or more new images to the machine learning model;

obtaining an new output of the machine learning model corresponding to the one or more new images; and determining a new state of the area of the property using the new output of the machine learning model, and determining the current state of the area of the property using the external data comprises verifying a particular state of the two or more states as the current state of the area of the property using the new state.

14. The method of claim 9, comprising:

determining a prior state for the area of the property;

determining that the prior state does not match the current state; and based on the prior state not matching the current state, notifying a user device of a change in the state of the area of the property.

15. The method of claim 14, wherein:
determining the current state of the area of the property comprises determining a device is present in the area of the property,
determining that the prior state for the area of the property comprises determining that device was previously not present in the area of the property, and
notifying the user device of the change in the state of the area of the property comprises transmitting a notice to the user device indicating at least one of the following:
a change in state of the area of the property has occurred,
the device was previously not present in the area of the property, and
the device is currently present in the area of the property.

16. The method of claim 14, wherein:
determining the current state of the area of the property comprises determining a device is connected to a second device,
determining that the prior state for the area of the property comprises determining that device was previously not connected to the second device, and
notifying the user device of the change in the state of the area of the property comprises transmitting a notice to the user device indicating at least one of the following:
a change in state of the area of the property has occurred;
the device was previously not connected to the second device in the area of the property; and
the device is currently connected to the second device in the area of the property.

17. The method of claim 14, wherein:
determining the current state of the area of the property comprises determining a device is in a first state,
determining that the prior state for the area of the property comprises determining that device was previously in a second state different from the first state, and
notifying the user device of the change in the state of the area of the property comprises transmitting a notice to the user device indicating at least one of the following:
a change in state of the area of the property has occurred;
the device was previously in the second state; and
the device is currently in the first state.

18. The method of claim 9, comprising:
determining a prior state for the area of the property;
determining that the prior state does not match the current state; and
based on the prior state not matching the current state,
generating instructions for one more external electronic devices to change a mode of the of the one or more electronic devices; and
transmitting the instructions to the one or more electronic devices.

19. A system comprising:
one or more computers; and
one or more computer-readable media storing instructions that, when executed, cause the one or more computers to perform operations comprising:
  obtaining images captured by a camera, the images depicting an area of a property;
  providing two or more images of the images to a machine learning model;
  obtaining an output of the machine learning model corresponding to the two or more images;
  determining two or more potential states of the area of the property using the output of the machine learning model, each of the two or more potential states corresponding to an image in the two or more images;
  determining that the two or more potential states are dissimilar using a threshold similarity score; and
  performing an action based on the two or more potential states not satisfying the threshold similarity score.

20. One or more non-transitory computer-readable media storing instructions that, when executed by one or more computers, cause the one or more computers to perform operations comprising:
  obtaining images captured by a camera, the images depicting an area of a property;
  providing two or more images of the images to a machine learning model;
  obtaining an output of the machine learning model corresponding to the two or more images;
  determining two or more potential states of the area of the property using the output of the machine learning model, each of the two or more potential states corresponding to an image in the two or more images;
  determining that the two or more potential states are dissimilar using a threshold similarity score; and
  performing an action based on the two or more potential states not satisfying the threshold similarity score.

* * * * *

UNITED STATES PATENT AND TRADEMARK OFFICE
CERTIFICATE OF CORRECTION

PATENT NO. : 11,734,932 B2  
APPLICATION NO. : 17/085726  
DATED : August 22, 2023  
INVENTOR(S) : Aaron Lee Roberts and Bret Jutras Page 1 of 1

It is certified that error appears in the above-identified patent and that said Letters Patent is hereby corrected as shown below:

In the Claims

In Claim 18, Column 42, Line 3, delete "of the of the" and insert -- of the --.

Signed and Sealed this  
Third Day of October, 2023

Katherine Kelly Vidal  
*Director of the United States Patent and Trademark Office*